(12) United States Patent
Neveu et al.

(10) Patent No.: US 11,841,275 B2
(45) Date of Patent: Dec. 12, 2023

(54) DEVICE FOR ANALYSING INFRARED RADIATION FROM A SURFACE OF A MOTOR VEHICLE PASSENGER COMPARTMENT

(71) Applicant: Valeo Systemes Thermiques, Le Mesnil-Saint-Denis (FR)

(72) Inventors: Daniel Neveu, Le Mesnil Saint Denis (FR); Laurent Rede, Le Mesnil Saint Denis (FR); Josselin Gour, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 508 days.

(21) Appl. No.: 16/646,778

(22) PCT Filed: Sep. 10, 2018

(86) PCT No.: PCT/FR2018/052197
§ 371 (c)(1),
(2) Date: Mar. 12, 2020

(87) PCT Pub. No.: WO2019/053359
PCT Pub. Date: Mar. 21, 2019

(65) Prior Publication Data
US 2020/0290430 A1    Sep. 17, 2020

(30) Foreign Application Priority Data
Sep. 12, 2017  (FR) ...................................... 1758456

(51) Int. Cl.
*B60H 1/22*  (2006.01)
*G01J 5/10*  (2006.01)
(Continued)

(52) U.S. Cl.
CPC ............ *G01J 5/10* (2013.01); *B60H 1/00735* (2013.01); *B60H 1/2218* (2013.01); *B60H 1/2226* (2019.05); *G01J 2005/0077* (2013.01)

(58) Field of Classification Search
USPC ..................................................... 454/69–165
See application file for complete search history.

(56) References Cited

U.S. PATENT DOCUMENTS 9,862,245 B2 *   1/2018   Kim ................... B60H 1/00742
2004/0089006 A1  5/2004   Kamiya et al.
(Continued)

FOREIGN PATENT DOCUMENTS

DE          19921518 A1    11/2000
DE        102015207645 A1   6/2016
(Continued)

OTHER PUBLICATIONS

Notice of Preliminary Rejection in corresponding Korean Application No. 10-2020-7010550, dated Jun. 28, 2021 (6 pages).
(Continued)

*Primary Examiner* — Ko-Wei Lin
(74) *Attorney, Agent, or Firm* — Osha Bergman Watanabe & Burton LLP

(57) ABSTRACT

The invention relates to a device (50) for analysing infrared radiation emitted or reflected by at least one surface (21) of a motor vehicle (1) passenger compartment (7), characterised in that said device comprises at least one infrared camera (51) arranged and oriented such as to measure at least part of the infrared radiation emitted or reflected by the at least one surface (21) of the passenger compartment (7).

5 Claims, 3 Drawing Sheets

Figure 1:
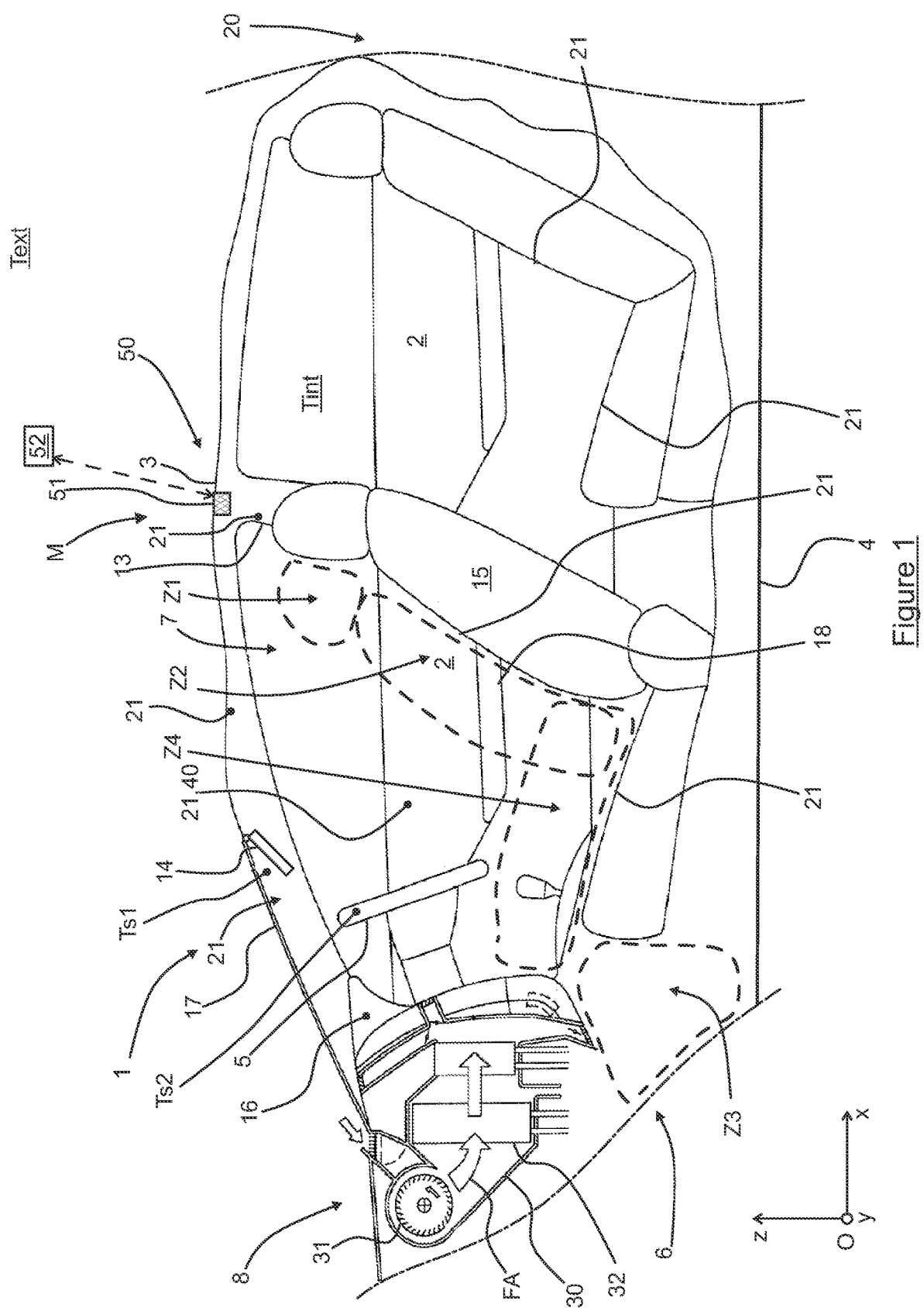

(51) Int. Cl.
*B60H 1/00* (2006.01)
*G01J 5/00* (2022.01)

(56) References Cited

U.S. PATENT DOCUMENTS

| | | | | |
|---|---|---|---|---|
| 2009/0179080 A1* | 7/2009 | Alston | B60H 1/00378 | 392/407 |
| 2011/0220797 A1* | 9/2011 | Hoelter | G01J 5/0875 | 264/2.7 |
| 2014/0093133 A1* | 4/2014 | Frank | G06V 40/10 | 382/104 |
| 2015/0075763 A1* | 3/2015 | Kim | B60H 1/00742 | 165/203 |
| 2015/0105976 A1* | 4/2015 | Shikii | B60H 1/00742 | 701/36 |
| 2017/0240022 A1* | 8/2017 | Ireri | A61B 5/01 | |
| 2017/0330044 A1* | 11/2017 | Telpaz | G05D 1/0088 | |
| 2018/0208017 A1* | 7/2018 | Hernandez | B60K 37/02 | |

FOREIGN PATENT DOCUMENTS

| | | |
|---|---|---|
| EP | 2030817 A2 | 3/2009 |
| JP | H06-293209 A | 10/1994 |
| JP | H06293209 A * | 10/1994 |
| JP | 2000-244781 A | 9/2000 |
| JP | 2001-238101 A | 8/2001 |
| JP | 2012-011930 A | 1/2012 |
| JP | 2017-030377 A | 2/2017 |
| KR | 10-2016-0124461 A | 10/2016 |

OTHER PUBLICATIONS

International Search Report and Written Opinion in corresponding International Application No. PCT/FR2018/052197, dated Jan. 22, 2019 (18 pages).

Notification of Reason for Rejection in corresponding Japanese Application No. 2020-515018, dated Mar. 19, 2021 (12 pages).

* cited by examiner

DEVICE FOR ANALYSING INFRARED RADIATION FROM A SURFACE OF A MOTOR VEHICLE PASSENGER COMPARTMENT

The present invention relates to devices for analyzing infrared radiation from a surface of an interior of a vehicle, notably a motor vehicle. It proposes such an analysis device. It also proposes an interior of the motor vehicle equipped with such a device. It also proposes a method for implementing such a device.

A motor vehicle is commonly equipped with a heating, ventilation and/or air conditioning installation to modify the temperature of air contained in an interior of the motor vehicle, based on the admission and/or recirculation of an air flow. The motor vehicle is additionally equipped with radiant panels capable of generating infrared radiation to heat the interior and consequently the passengers in the vehicle.

In order to control the comfort of a user present inside the interior of the motor vehicle, the latter is commonly equipped with a sensor for sensing the temperature of the air contained in the interior. However, thermal perception is often unrelated to the temperature of the air contained in the interior. This is because the infrared radiation from the outside or from radiant panels present in the interior does not always affect the temperature of the air contained in the interior. Thus the drawback of such a temperature sensor is that it does not take the user's thermal perception into account.

An object of the present invention is to propose an analysis device capable of supplying information that takes the user's thermal perception into account. This is because such thermal perception is often unrelated to the temperature of the air contained in the interior.

An object of the present invention is therefore to propose an analysis device capable of supplying information to the thermal comfort control system that takes the user's thermal perception into account.

Thus the present invention proposes a device for analyzing an infrared radiation reflected by at least one surface of a motor vehicle interior, characterized in that it comprises at least one infrared camera arranged and oriented so as to measure at least a part of the infrared radiation reflected by the at least one surface of the interior.

Thus such an analysis device makes it possible to take into account the infrared radiation reflected from the surfaces of the interior, providing better comfort control by taking into account parameters other than the temperature of the interior, which does not always reflect the temperature perceived by the users of the vehicle. Thus, by using this infrared camera, the data relating to the comfort of the interior will now take the perceived temperature into account.

Furthermore, the installation of such an infrared camera has the advantage of being simple and rapid to implement and install in the interior of the motor vehicle. Furthermore, the use of the infrared camera offers other useful ways of controlling comfort or safety on board the motor vehicle.

It should be noted that the terms "arranged and oriented" are taken to mean that the field of view of the at least one infrared camera comprises at least a part of the surfaces of the interior.

"Surface of the interior" is taken to mean any surface included in the interior from which the infrared radiation can be reflected.

According to one or more characteristics that may be considered singly or in combination, it may be provided that:

The analysis device comprises a control unit associated with the at least one infrared camera, and is configured to operate a heating, ventilation and/or air conditioning installation, and/or at least one radiant panel present in the interior. For example, the control unit commands the installation to blow an air-conditioned or heated air flow to reach a setpoint temperature. "Operate the radiant panel" is taken to mean that the control unit is configured for controlling the infrared radiation emitted by the radiant panel. For example, if the infrared radiation is too strong relative to a setpoint, the control unit commands a reduction in the production of infrared radiation from part or all of the radiant panel or panels.

The analysis device takes the form of a dome, the analysis device having a field of view of between 180 and 360 degrees. In this arrangement, the dome comprises at least one infrared camera. The camera or cameras, each provided with an identical or specific sensor and optical system, are arranged and oriented so that they jointly delimit a field of view of between 180 and 360 degrees. Evidently, therefore, such a dome makes it possible to cover either a part of the interior, notably a part comprising the front seat, or the whole of the interior.

The analysis device is designed to be fixed in the interior of the motor vehicle.

The analysis device is designed to be fixed to an element of the interior chosen from a roof of the interior and a pillar of the interior. Thus the visibility of the at least one camera is optimal.

The at least one infrared camera has a resolution of 24×32 pixels or more. If there is a plurality of infrared cameras, at least one of the infrared cameras has a resolution of 24×32 pixels or more. According to one embodiment, each infrared camera has a resolution of 24×32 pixels or more. This resolution permits a precise analysis of the infrared radiation in the interior. For example, this resolution permits mapping of more than 700 separate points.

The at least one infrared camera is configured for determining a mean temperature of a wall of the interior having a dimension of between 10 and 100 mm. In this arrangement, the infrared camera has a spatial resolution of not more than 100 mm Each of the four cameras has a scanning angle of at least 90 degrees, the cameras being arranged so that each measurement field is superimposed on at least one other measurement field.

Advantageously, the at least one infrared camera is designed to be arranged and oriented so as to analyze the infrared radiation delivered by all the surfaces of the interior.

The at least one infrared camera is designed to be arranged and oriented so as to analyze at least part of the infrared radiation delivered by a radiant panel. Thus it will be understood that, in addition to the analysis of the infrared radiation from the surfaces of the interior, the analysis device is also configured for analyzing the radiation emitted by a radiant panel. It will also be understood that the field of view of the camera comprises the surfaces of the interior and at least a part of the radiant panel present in the interior.

The invention also proposes a motor vehicle interior comprising at least one surface, characterized in that the interior comprises an analysis device as defined above.

According to one or more characteristics that may be considered singly or in combination, it may be provided that:

The analysis device is fixed to an element of the interior chosen from a roof of the interior and a pillar of the interior.

The at least one infrared camera is fixed to a roof of the interior. Such a location facilitates the analysis of the infrared radiation on the basis of a position in terms of height of the infrared camera in the interior.

The infrared camera is placed in the middle of the roof or near the middle of the roof, that is to say less than 30 cm from the middle of the roof. It will be understood that the middle of the roof is the point on the roof located at equal distances from the edges of the roof. More precisely, the middle of the roof is located at equal distances from the doors of the motor vehicle facing one another. It will also be understood that the middle is the point on the roof of the motor vehicle located at equal distances from the instrument panel and a rear end of the motor vehicle. Thus the middle is a point belonging to both the median longitudinal plane and the median vertical plane of the motor vehicle. This particular location of the infrared camera provides it with an optimal view of the interior.

The infrared camera is positioned on a pillar of the interior, that is to say on one of the structural elements connecting the body to the roof of the interior, between the various glazing units. In this arrangement, the field of view of the analysis device is between 90° and 180°.

The infrared camera is configured for analyzing the infrared radiation delivered by the at least one radiant panel located in the motor vehicle, as well as the infrared radiation emitted or reflected by walls of the interior.

The at least one infrared camera of the analysis device is arranged and oriented toward an instrument panel, and/or a side window, and/or a windshield, and/or a front sun visor of the motor vehicle, and/or a cushion and/or a back of a front and/or rear seat, and/or a steering wheel.

At least one of the surfaces of the interior is a roof of the compartment or a pillar of the compartment or a sun visor or an upper glazed portion of a door or an instrument panel or a door trim, or an armrest or a surface delimiting a footwell or a part of a floor or a seat cushion or a seat back or a part of a steering wheel or a windshield.

The control unit of the analysis device is configured for controlling the heating, ventilation and/or air conditioning installation designed to deliver an air flow. For example, the control unit commands the heating, ventilation and/or air conditioning installation to blow an air-conditioned or heated air flow to reach a setpoint temperature in the interior.

The control unit of the analysis device is configured for controlling the at least one radiant panel. For example, the control unit commands the radiant panel to emit more or less infrared radiation.

The at least one radiant panel is oriented toward the interior.

A plurality of radiant panels are arranged in the interior so as to cover at least a head area and/or a chest area and/or a foot area and/or a leg area. "Cover" is taken to mean that the infrared radiation emitted by each of the radiant panels is directed toward at least one of these areas. According to an example of embodiment, the head area is located at the position of a headrest, the chest area is located at the position of a seat back, the foot area is located at the position of a footwell, and the leg area is located at the position of a cushion of the seat. Thus it will be understood that the head area is an area of the interior capable of receiving a user's head, the chest area is designed to receive a user's chest, the foot area is designed to receive the user's feet, and the leg area is designed to receive the user's legs. For this purpose and according to this example of embodiment, a first set of radiant panels comprises a radiant panel arranged on the roof, above a window of the vehicle, and another radiant panel arranged on a pillar. In order to cover the chest area, a second set of radiant panels comprises a radiant panel located in a door trim and a second radiant panel located under the steering wheel. In order to cover the foot area, a third set of radiant panels comprising three radiant panels is provided, with a first radiant panel located on the floor, a second radiant panel located on a side of a center console, and a third radiant panel located on a lower part of the instrument panel. In order to cover the leg area, a fourth set of radiant panels comprises a first radiant panel arranged on an upright of the motor vehicle and a second radiant panel under the instrument panel.

At least one radiant panel is oriented toward the head area.

At least one radiant panel is oriented toward the chest area.

At least one radiant panel is oriented toward the foot area.

At least one radiant panel is oriented toward the leg area.

The invention also proposes a method for using an infrared radiation analysis device fitted to the interior as defined above, characterized in that the method comprises:
a first step of acquiring an infrared radiation reflected by the at least one surface,
a second step of converting the infrared radiation acquired in the first step into at least one surface temperature of a radiant panel and/or a surface temperature of at least one wall of the interior. Thus this method makes it possible to discover the surface temperatures of the surfaces of the interior.

According to one or more characteristics that may be considered singly or in combination, it may be provided that:
The infrared radiation acquired in the first step is the infrared radiation emitted by each of the surface elements of the interior. This infrared radiation is emitted toward each of the pixels of the sensor or sensors arranged facing each of the surface elements of the interior. Here, "facing" means that the sensor is arranged so as to receive an infrared radiation issuing from at least one surface element, notably as a result of its location, its orientation, its resolution and/or the specific nature of its optical system.

The surface temperature converted in the second step is the mean surface temperature associated with each of the surface elements. This conversion takes into account, notably, the infrared emissivity of each surface element. The infrared emissivity of a surface element is calibrated in advance and obtained from a computer of the analysis device.

The first step is executed by means of the at least one infrared camera.

The second step is executed by a computer of the analysis device.

The second step of the method is executed by calculating at least one mean surface temperature for each area of the interior.

The second step comprises measurement of infrared radiation delivered by the at least one radiant panel present in the interior.

The method comprises a third step of operating a heating, ventilation and/or air conditioning installation, and/or a radiant panel, to control a temperature perceived in the interior.

The method comprises a fourth step of measuring a differential temperature, the differential temperature being defined as a difference between an interior temperature of the air contained in the interior and an exterior temperature of the air present outside the motor vehicle.

The method comprises a fifth step of mapping surface temperatures of the interior and/or of the radiant panel. This fifth step is executed in order to calculate a radiative temperature for at least one area of the body of at least one passenger. The radiative temperature for at least one area of the body is that which may be used to calculate the infrared heat flow received by this area of the body, independently of the heat flow received by heat exchanges with the air.

Figure 2:
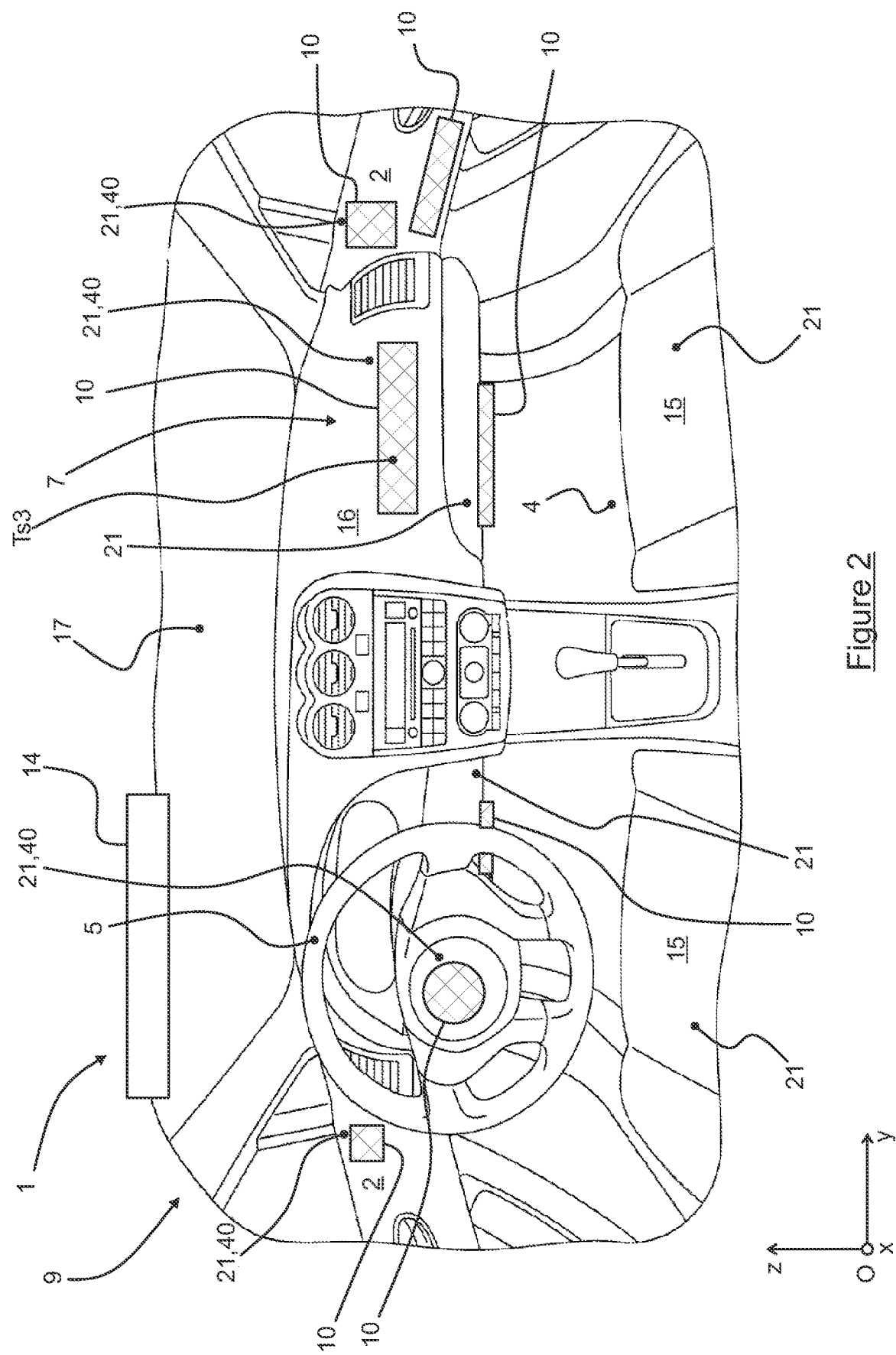
Figure 3:
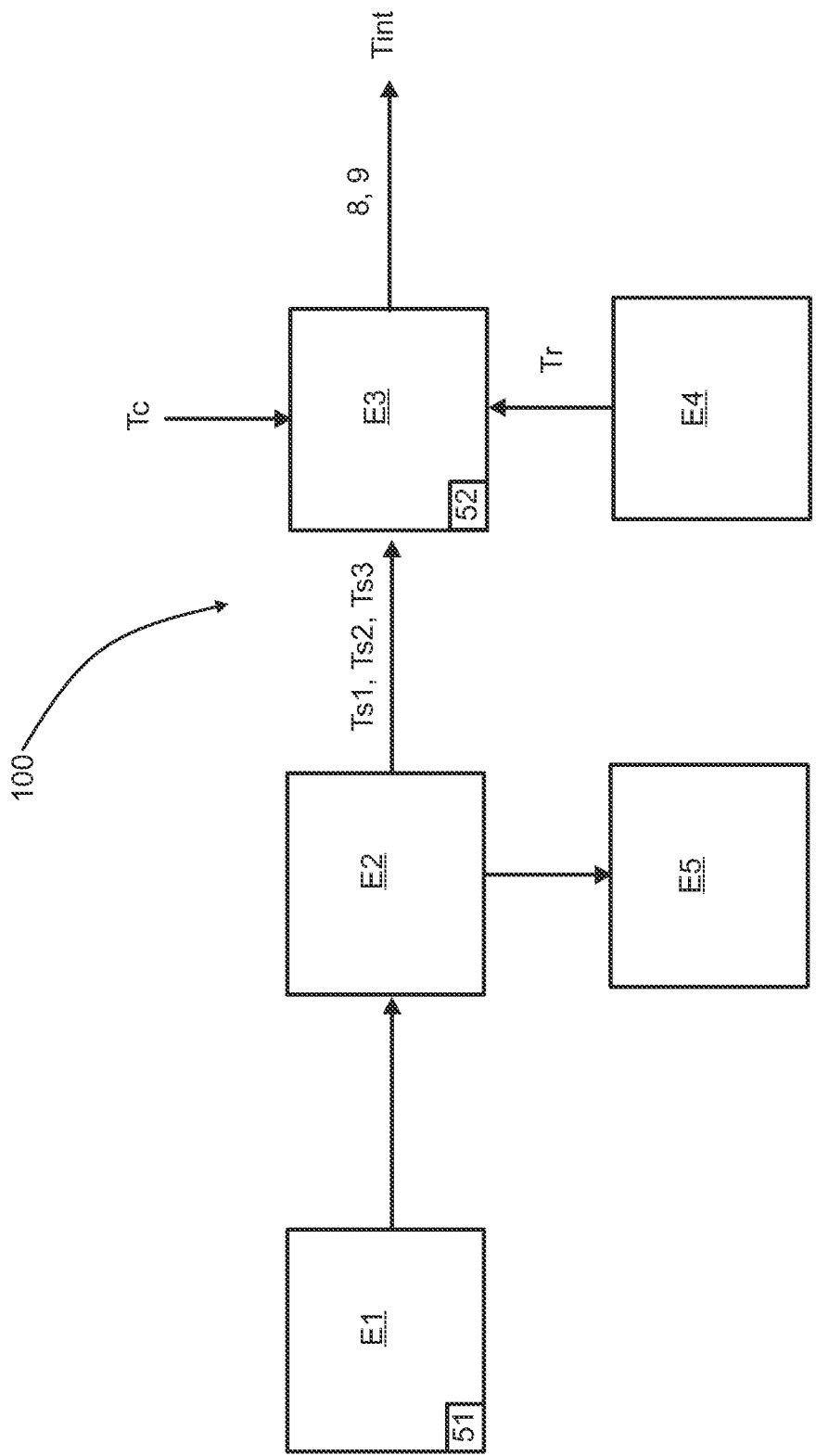

Other characteristics, details and advantages of the invention will be more readily apparent from a perusal of the description provided below for guidance only, with reference to drawings in which:

FIG. 1 is a partial view of a longitudinal section of an interior of a motor vehicle equipped with an analysis device according to the present invention, FIG. 2 is a partial perspective view of a vertical section of the interior shown in FIG. 1, FIG. 3 is a view showing a schematic illustration of a method of the present invention.

It should be noted, in the first place, that the figures show the invention in a detailed manner for the purpose of applying the invention, and that said figures may evidently serve to define the invention more closely if necessary.

In the figures, the terms longitudinal, transverse, vertical, side, left, right, upper, lower, front and rear refer to the orientation of a motor vehicle 1 in an orthonormal reference frame Oxyz. In this reference frame, the axis Ox represents the longitudinal direction, the axis Oy represents the transverse direction, and the axis Oz represents the vertical direction of the object concerned, notably the motor vehicle 1. The axis Ox extends in one of the planes defining the orthonormal reference frame Oxyz and in the direction of advance of the motor vehicle when it is moving forwards or backwards. The axis Oy extends in a plane parallel to the ground and perpendicular to the axis Ox defined above. Commonly, the axis Oy extends between two doors 2 arranged opposite one another, in other words from one side of the motor vehicle 1 to another side of the motor vehicle 1 so that a forward direction, a backward direction or an overall width of the vehicle along this axis Oy can be measured. The axis Oz extends in a plane parallel to the earth's gravitational axis and extends between a roof 3 and a floor 4 of the motor vehicle 1. A longitudinal nature of an element implies that this element extends along the axis Ox. A transverse nature of an element implies that the element extends along the axis Oy. A vertical nature of an element implies that the element extends along the axis Oz. In the reference frame Oxyz, a longitudinal plane is parallel to the plane Oxz, a transverse plane is parallel to the plane Oxy and a vertical plane is parallel to a plane Oyz. The term "side" characterizes an element which is located on one or other side of a median longitudinal plane of the motor vehicle 1, the median longitudinal plane being a longitudinal plane dividing the motor vehicle 1 into two equal portions on either side of the median longitudinal plane Oxz. The terms "right" or "left" characterize a part of the motor vehicle 1 located on either side of the median longitudinal plane, a left part comprising, for example, a steering wheel 5 of the motor vehicle 1, while a right part does not include this element. The terms "upper" and "lower" characterize a part of the motor vehicle 1 located on either side of a median transverse plane Oxy, the upper part comprising the roof 3 and the lower part comprising the floor 4. The median transverse plane is a transverse plane dividing the motor vehicle 1 into two equal portions. The terms "front" and "rear" characterize a part of the motor vehicle 1 located on either side of a median vertical plane Oyz, the front part comprising the steering wheel 5 and the rear part not including this element. The median vertical plane is a vertical plane dividing the motor vehicle 1 into two equal portions.

FIG. 1 shows that the motor vehicle 1 comprises an interior 7 in which a user can sit. The interior 7 comprises surfaces 21 that may be subjected to infrared radiation. This infrared radiation may originate from an environment external to the vehicle, such as solar radiation, or may issue from a radiant panel 10 present in the interior 7 of the motor vehicle 1, as described below.

As shown in FIGS. 1 and 2, the interior 7 comprises various surfaces 21 on which the infrared radiation is reflected. An illustrative list of these surfaces is given below.

In the bodywork, among the surfaces 21, it is possible to distinguish the roof 3 of the motor vehicle 1 and the pillar 13 of the motor vehicle 1, the pillar 13 being an upright of the motor vehicle 1 joining the floor 4 of the motor vehicle 1 to the roof 3. It should be noted that the roof 3 may be divided into a number of parts, with a first part extending from the windshield 17 to a highest point of the roof 3, this first part being arranged near a sun visor 14, a second part located between a highest point of the roof 3 and an upper portion of the doors 2, this part being commonly curved, a third part located above the front seats 15, and optionally a fourth part located above the rear seats 15, when these are present.

At the position of instrument panel 16, it is possible to distinguish, among the surfaces 21, a surface forming the instrument panel 16 of the motor vehicle 1 and a surface forming the center console. The instrument panel 16 is a transverse element of the motor vehicle 1 located under a windshield 17 of the vehicle 1 and comprising the wall of the steering wheel 5 of the motor vehicle 1. The instrument panel 16 comprises the indicators of the motor vehicle 1 required for driving the vehicle, such as counters, browsers or the like. The instrument panel 16 is usually oriented toward the chest of a user, regardless of whether he is a driver or a passenger, seated in the front seats 15. The center console, for its part, is a longitudinal element of the motor vehicle 1 extending on the floor 4 of the motor vehicle 1. The center console comprises, for example, a handbrake, when this is present, or storage areas.

The center console with the instrument panel 16 jointly define footwells of the vehicle 1. The footwell is a lower area of the front part of the motor vehicle 1, notably located in front of the front seats 15, regardless of whether these are driver's or passenger's seats. The footwell is designed to receive the feet of users seated in the front of the motor vehicle 1.

Among the surfaces 21 of the interior 7, it is also possible to distinguish the trim of the doors 2, the armrest 18 fitted to these doors 2 and the side windows of the vehicle, on which the infrared radiation is reflected, being reflected toward the chest and/or the arms of a user.

Among the surfaces 21 of the interior 7, it is also possible to distinguish the surfaces forming the seats 15 of the vehicle, such as the seat cushions and backs, the headrests 15a and the rear bench seat.

Depending on the exposure of the motor vehicle 1, some of these surfaces 21 are subjected to infrared radiation and may then become strongly heated. In this case, these surfaces 21 reflect and refract the infrared radiation inside the interior 7, and may heat a user and/or impart a thermal perception of high heat to him, independently of an interior temperature Tint of the air contained in the interior 7.

By convention, in the rest of the description of the present invention, the air contained in the interior 7 of the motor vehicle 1 is called "interior air" and air present outside the motor vehicle 1 is called "exterior air". Similarly, the term "interior temperature" Tint characterizes a temperature of the air contained in the interior 7, while "exterior temperature" Text is equivalent to a temperature of the air present outside the motor vehicle 1. Because of these arrangements, it is desirable to have a radiation balance for the surfaces of the interior 7 of the motor vehicle 1, to provide better control of the user's thermal comfort inside the interior 7. This object is achieved by the arrangements of the present invention.

It is also possible to define areas Z1, Z2, Z3, Z4 in the interior 7, in which a user of the vehicle 1 is intended to move when he is present in the vehicle. According to the illustrated example, four areas Z1, Z2, Z3, Z4 are distinguished, with a first area Z1 located at the position of a headrest 15a, also called the head area Z1, a second area Z2 located at the position of a seat back 15, also called the chest area Z2, a third area Z3 located at the position of a footwell, also called the foot area Z3, and a fourth area Z4 located at the position of the seat 15, also called the leg area Z4. Thus it will be understood that the head area Z1 is an area of the interior 7 capable of receiving a user's head, the chest area Z2 is designed to receive a user's chest, the foot area Z3 is designed to receive the user's feet, and the leg area Z4 is designed to receive the user's legs. As a general rule, the head area Z1 lies above the chest area Z2, which lies above the foot area Z3, and the leg area Z4 is interposed vertically between the chest area Z2 and the foot area Z3.

According to the present invention, the motor vehicle 1 is provided with a device 50 for analyzing the infrared radiation reflected by the surfaces 21 of the interior 7. The analysis device 50 comprises at least one infrared camera 51 which is capable of remotely measuring the infrared radiation reflected by the at least one of the surfaces 21 of the interior 7. According to one embodiment, the infrared camera 51 is arranged and oriented toward the areas Z1, Z2, Z3, Z4 in which a user may be present.

It should be noted that "infrared camera" 51 is taken to mean any device for acquiring images and/or video recordings in the infrared spectrum at least, the infrared spectrum corresponding to wavelengths of between 7 and 14 micrometers.

The infrared radiation reflected by the at least one of the surfaces 21 of the interior 7 is measured in all cases by at least one infrared camera 51 located in the interior 7. Preferably, the infrared radiation measured by the infrared camera 51 is located in the interior 7 only. Thus the infrared camera 51 is arranged and oriented so as to capture the infrared radiation at a point or at a surface of the interior 7.

The infrared camera 51 is arranged and oriented so as to capture the infrared radiation at a point or at a surface of the interior 7, such as a surface 21 of the interior. By means of the analysis device 50, this infrared radiation is quantified and is then converted into a surface temperature Ts1 of a given surface 21 or of a given point. Evidently, the infrared camera 51 is capable of simultaneously measuring the infrared radiation of the whole of the interior located in its field of view, thereby enabling the analysis device 50 to deduce simultaneously a first surface temperature Ts1 of at least one of the surfaces 21, together with a second surface temperature Ts2 of at least another of the surfaces 21.

It may also be provided that the analysis device 50 is configured for mapping both the infrared radiation measurements and the surface temperatures Ts1, Ts2. More precisely, the infrared camera 51 is configured for producing an infrared image in at least two dimensions of at least a part of the interior 7, which is located in a field of view of the infrared camera 51. Preferably, the infrared camera 51 is configured for producing an infrared image in two dimensions of the areas Z1, Z2, Z3, Z4 capable of receiving a user or a part of the user's body.

When the analysis device 50 comprises a plurality of infrared cameras 51 whose respective fields of view overlap, the infrared cameras 51 are capable of producing a three-dimensional infrared image of the interior 7 and/or of the areas Z1, Z2, Z3, Z4. The infrared camera is configured for determining a mean temperature of a wall of the interior having a dimension smaller than or equal to 100 mm By way of example, each infrared camera 51 is a camera having a spatial resolution of between 10 and 100 mm.

The infrared camera 51 is advantageously arranged in the middle M of the roof 3 of the motor vehicle 1. It will be understood that the middle M is the point of the roof 3 of the motor vehicle 1 located at equal distances from the doors 2 of the motor vehicle placed facing one another along the axis Oy. It will also be understood that the middle M is the point on the roof 3 of the motor vehicle 1 which is located at equal distances from the instrument panel 16 and a rear end 20 of the motor vehicle 1 along the axis Ox. Thus the middle M is a point belonging both to the median longitudinal plane and to the median vertical plane of the motor vehicle 1. This particular positioning of the infrared camera 51 enables it to provide an optimized view of the interior 7 and notably of the surfaces 21 capable of reflecting the infrared radiation, for the purpose of developing an optimized analysis of the surface temperatures Ts1, Ts2 of the surfaces 21.

According to a variant embodiment, the infrared camera 51 is arranged in a rear part of the roof 3, that is to say over the rear seats 15. According to another variant embodiment, the infrared camera 51 is installed in a front part of the roof 3, for example at the base of a central rear-view mirror.

The analysis device 50 may comprise a plurality of infrared cameras 51 which, together, are capable of covering a field of view of 360°, for providing a full analysis of the infrared radiation of the surfaces 21 of the interior 7. It will be understood from this that the infrared cameras 51 are capable of taking into account any part of the interior 7 which is subjected to infrared radiation, such as the infrared radiation emitted by radiant panels 10 or of solar origin, or by other specific constraints.

Preferably, a dome, for example a hemispherical dome, houses one or more infrared cameras 51, the sum of whose angles of view preferably covers at least 180°, and more preferably 360°. According to one embodiment, the infrared cameras 51 are arranged radially around the middle M of the roof 3, so that their respective angles of view follow one another in a circular way around the middle M, so that they jointly cover 360°.

The infrared camera 51 advantageously has a measurement refresh rate of between one second and ten seconds, the heat exchanges taking place over a timescale of between one second and ten seconds. Thus, the measurement supplies a surface temperature Ts1, Ts2 corresponding to a mean temperature associated with each pixel with an accuracy of less than +/−2° C. Thus such a measurement makes it possible to distinguish a temperature difference of less than 2° C. between two pixels. The spatial resolution of the temperature measurement is sufficient to enable maximum and minimum temperatures of the surfaces 21 located in the field of view of the infrared camera 51 to be isolated.

By taking into account some or all of the calculated surface temperatures Ts1, Ts2, some of which temperatures are notably different from other temperatures because of their location and exposure, a control unit 52, which is in communication with the analysis device 50 and the infrared camera or cameras 51, can control the thermal comfort of the interior in an appropriate way. In other words, by taking into account the surface temperatures Ts1, Ts2, the control unit 52 can control a system 6 for controlling the comfort of the interior, referred to hereafter as the system 6.

The system 6 comprises, for example, a heating, ventilation and/or air conditioning installation 8, referred to hereafter as the installation 8, which can modify the interior temperature Tint on the basis of the admission and/or recirculation of an air flow FA inside the interior 7 of the motor vehicle 1, in order to reach a setpoint temperature Tc. Such an installation 8 comprises a casing 30 which houses a blower 31 for circulating the air flow FA in the casing 30 toward the interior 7, and a heat exchanger 32 capable of modifying a temperature of the air flow FA during its passage through the heat exchanger 32.

Additionally, the system 6 comprises a device 9 for heating the interior 7 on the basis of radiation heating. The heating device 9 comprises at least one radiant panel 10 designed to emit infrared radiation. By emitting infrared radiation which is radiated onto, and if appropriate reflected on, the surfaces 21 of the interior 7 or onto the user, such a radiant panel 10 enables the thermal comfort perceived by the user to be improved. More precisely, the radiant panel 10 improves a temperature perceived by the user, so that the user has the impression that the system 6 has reached the setpoint temperature Tc. It should be noted that the radiant panel 10 has little effect on the real temperature Tint of the interior 7.

Each radiant panel 10 comprises a plurality of electrodes capable of delivering heat by infrared radiation. The electrodes are formed, for example, by screen printing on a conductive substrate.

Preferably, the heating device 9 comprises a plurality of radiant panels 10 arranged at various locations in the interior 7. More precisely, the radiant panels 10 are housed inside the interior 7 and are oriented so as to emit infrared radiation toward the interior 7, and not toward the outside of the motor vehicle 1.

As may be seen in FIG. 2, the radiant panels 10 are applied to walls 40 delimiting the interior 7. These walls 40 form, for example, the doors 2, the roof 3, the floor 4 and/or the instrument panel 16.

Each radiant panel 10 is, for example, designed to heat one of the areas Z1, Z2, Z3, Z4 of the interior 7 capable of receiving a user or a part of the user's body, by emitting infrared radiation toward the particular area assigned to it. In other words, each radiant panel 10 is assigned to the thermal treatment of one of the areas Z1, Z2, Z3, Z4 of the interior 7. In other words, at least part of an orthogonal projection from the surface of the radiant panel 10 into the interior 7 is designed to encounter the user, at least partially. Thus, the radiant panels 10 are oriented toward at least one area Z1, Z2, Z3, Z4 of the interior 7 which is designed to be heated by infrared radiation.

If the interior 7 is equipped with at least one radiant panel 10, the infrared camera 51 measuring the infrared radiation reflected by the surfaces 21 may also be configured for measuring the infrared radiation emitted by the radiant panels 10. In this case, the analysis device 50 deduces from these measurements a first surface temperature Ts1 of the surfaces 21 and another surface temperature Ts3 of the radiant panels 10, and then communicates these temperatures, by appropriate wired or remote means, to the control unit 52, which can operate the installation 8 and/or the heating device 9 according to the nature of these surface temperatures Ts1, Ts3.

By taking into account some or all of the calculated surface temperatures Ts1, Ts2, Ts3, some of which temperatures are notably different from other temperatures because of their location and exposure, a control unit 52, which is in communication with the analysis device 50 and the infrared camera or cameras 51, can operate the comfort control system 6 in an appropriate way.

For this purpose, the infrared camera 51 measures the infrared radiation reflected by the surfaces 21, and possibly by the radiant panels 10 as well. These data are taken into account, in real time, by the analysis device 50 which deduces from them the surface temperatures Ts1, Ts2, Ts3 of the surfaces 21, and possibly those of the radiant panels 10 as well. The analysis device 50 communicates these surface temperatures Ts1, Ts2, Ts3 by appropriate wired or remote means to the control unit 52, which can then operate the heating, ventilation and/or air conditioning installation 8 and possibly the heating device 9, if this is present, on the basis of these surface temperatures Ts1, Ts2, Ts3.

For example, if the surface temperature Ts1, Ts2 of at least one of the surfaces 21 located in one of the areas Z1, Z2, Z3, Z4 of the interior 7 defined above, or the surface temperature Ts3 of one of the radiant panels 10, is above a predetermined threshold temperature, the control unit 52 then commands the heating, ventilation and/or air conditioning installation 8 to cool the interior 7, and if radiant panels 10 are present, the control unit 52 commands a decrease in the production of infrared radiation by some or all of the radiant panels 10 covering this area Z1, Z2, Z3, Z4. In the contrary case, that is to say if the surface temperature Ts1, Ts2, Ts3 in an area Z1, Z2, Z3, Z4 of the interior 7 is below a predetermined threshold temperature, the control unit 52 then commands the heating, ventilation and/or air conditioning installation 8 to heat the interior 7, and if radiant panels 10 are present, the control unit 52 commands an increase in the production of infrared radiation by some or all of the radiant panel or panels 10 covering this area Z1, Z2, Z3, Z4.

In other words, the control unit 52 is capable of producing a radiative thermal balance for the surfaces 21 and therefore for the areas Z1, Z2, Z3, Z4 of the interior 7 on the basis of the information supplied by the infrared camera 51 for the end purpose of controlling the temperature perceived by the user. The control unit 52 is also capable of calculating and taking into account a radiative temperature of the interior 7.

It will be understood, therefore, that the control unit 52 is capable of operating the heating, ventilation and/or air conditioning installation 8 and possibly the heating device 9, if this is present. In other words, on the basis of precise information relating to the surface temperatures Ts1, Ts2 of the surfaces 21, and possibly of the radiant panels 10, collected by the infrared camera 51, the control unit 52 is configured, by calculation, for optimizing the use of the heating, ventilation and/or air conditioning installation 8 and/or of the heating device 9, to obtain the setpoint temperature Tc as rapidly and efficiently as possible, at least in terms of the temperature perceived by the user.

The control unit 52 is also capable of detecting abnormal heating of the interior 7 or of one of its areas, so that a user can be warned, for example in case of an outbreak of fire in the interior 7. According to one embodiment, the control unit 52 is also capable of detecting the presence of a person or of an animal when the vehicle is locked. It will be understood, therefore, that according to one embodiment the control unit 52 is configured for providing a warning, for example by triggering the optical signaling devices of the vehicle, such as the flashing warning lights, and/or by triggering the vehicle's horn, and/or by using a satellite network, and/or by remote notification via a smartphone application.

FIG. 3 shows schematically a method 100 for using the analysis device 50, comprising at least a first step E1 of acquiring infrared radiation in the interior 7 of the motor vehicle 1. This first step E1 is executed with the aid of the infrared cameras 51 forming the analysis device 50. More precisely, this first step comprises a measurement of the first surface temperature Ts1 of at least one of the surfaces 21 of the interior 7.

The method 100 comprises a second step E2, in which the infrared radiation measured in the first step E1 is converted into surface temperature Ts1, Ts2, Ts3. At least one of these surface temperatures Ts1, Ts2 is representative of the temperature of at least one of the surfaces 21 of the interior 7. Evidently, this second step E2 may also comprise the calculation of the surface temperature Ts3 of a radiant panel 10 present in the interior 7. It should be noted that, at the end of this second step E2, the method 100 may comprise a step of displaying a map of the surface temperatures calculated in the interior 7.

The method 100 then comprises a third step E3 of operating the heating, ventilation and/or air conditioning installation 8 fitted to the motor vehicle 1 and/or a heating device 9, that is to say some or all of the radiant panels 10, on the basis of the surface temperature Ts1, Ts2 measured in the previous step. This operating step E3 consists, for example, in controlling the infrared radiation reflected by the surfaces 21 toward an area Z1, Z2, Z3, Z4 of the interior 7. This third operating step E3 is executed with the aid of the control unit 52 described above.

By controlling the heating, ventilation and/or air conditioning installation 8 fitted to the motor vehicle 1, it is possible to control the interior temperature Tint of the air contained in the interior 7.

Thus the control unit 52 is capable of modifying heating power delivered to the interior 7. If the first surface temperature Ts1 and/or the second surface temperature Ts2 measured is greater than a setpoint value Tc, the control unit 52 can stop the heating device 9 and/or put the installation 8 into operation in air conditioning mode. If the first surface temperature Ts1 and/or the second surface temperature Ts2 measured is less than a setpoint value Tc, the control unit 52 can put the heating device 9 into operation and/or put the installation 8 into operation in heating mode.

More particularly if the motor vehicle 1 is equipped with an installation 8 only, the control unit 52 is capable of modifying heating power delivered by the installation 8. If the first surface temperature Ts1 and/or the second surface temperature Ts2 measured is greater than a setpoint value, the control unit 52 can put the installation 8 into operation in air conditioning mode. If the first surface temperature Ts1 and/or the second surface temperature Ts2 measured is less than the setpoint value, the control unit 52 can put the installation 8 into operation in heating mode. The control unit 52 is, for example, capable of preconditioning an interior 7 in the absence of a user as soon as a setpoint value is exceeded.

Similarly, if the motor vehicle 1 is equipped with a heating device 9 only, the control unit 52 is capable of modifying heating power delivered by the heating device 9. If the first surface temperature Ts1 and/or the second surface temperature Ts2 measured is greater than a setpoint value, the control unit 52 can stop the heating device 9. If the first surface temperature Ts1 and/or the second surface temperature Ts2 measured is below the setpoint value, the control unit 52 can put the heating device 9 into operation. The control unit 52 is, for example, capable of preconditioning an interior 7 in the absence of a user as soon as a setpoint value is exceeded.

It should be noted that such a method 100 may be executed equally well when the vehicle is stationary, that is to say at the stage of preconditioning the comfort of the interior 7, during starting, that is to say at the stage of convergence of the comfort of the interior 7, and/or during stabilized running, that is to say at the stage of maintaining the comfort of the interior 7. Thus the control unit 52 is, for example, designed to precondition an interior 7 in the absence of a user, notably as soon as a setpoint value is exceeded.

Additionally, the method 100 comprises a fourth step E4 of measuring a differential temperature Tr, defined as a difference between the interior temperature Tint of the air contained in the interior 7 and the exterior temperature Text of the air present outside the motor vehicle 1. The differential temperature Tr is, for example, displayed on a display screen simultaneously with the map of the surface temperatures Ts1, Ts2, Ts3.

The method 100 may also comprise a fifth step E5 of producing a map of the surface temperatures Ts1, Ts2, Ts3 of the interior 7, in order to calculate a radiative temperature for at least one area of the body of at least one passenger. The radiative temperature for at least one area of the body is that which may be used to calculate the infrared heat flow received by this area of the body, independently of the heat flow received by heat exchanges with the air.

This map may then be displayed in order to provide a thermal image of the interior 7. In short, this map may be used to determine the equivalent ambient temperatures perceived by each part of the user's body, and to adjust the thermal comfort of the interior 7 accordingly.

Thus the analysis device 50 according to the present invention, and its use, provide a rapid analysis of the temperature as well as simplified comfort control, due to the presence of the control unit 52. This results in optimized comfort, based on obtaining a perceived temperature close to a setpoint value Tc as rapidly as possible after the installation 8 and/or the heating device 9 has been put into operation. Indeed, the setpoint temperature Tc may be reached in less than 10 to 30 seconds at a given point.

The invention claimed is:

1. An analysis device for analyzing infrared radiation emitted or reflected by at least one surface of an interior of a motor vehicle, the analysis device comprising:
    at least one infrared camera arranged and oriented so as to measure at least part of the infrared radiation emitted or reflected by the at least one surface of the interior, and
    a control unit associated with the at least one infrared camera and configured to control an interior temperature of air present in the interior of the motor vehicle, wherein the control unit is configured for adjusting at least one radiant panel present in the interior based on the infrared radiation emitted or reflected by the at least one surface of the interior;

wherein the analysis device is further configured to measure a differential temperature between the interior temperature and an exterior temperature of air present outside the motor vehicle;

wherein the analysis device is configured to convert the infrared radiation emitted into at least one surface temperature of the at least one radiant panel and a surface temperature of the at least one surface of the interior;

wherein the analysis device is further configured to map the at least one surface temperature of the at least one radiant panel and the surface temperature of the at least one surface of the interior after the control unit controls the interior temperature of the air present in the interior of the motor vehicle.

2. The analysis device as claimed in claim 1, wherein the device is in the form of a dome, and wherein the device has a field of view of between 180 and 360 degrees.

3. An interior of a motor vehicle, comprising:
at least one surface; and,
an analysis device comprising:
at least one infrared camera arranged and oriented so as to measure at least part of infrared radiation emitted or reflected by the at least one surface of the interior, and
a control unit associated with the at least one infrared camera and configured to control an interior temperature of air present in the interior of the motor vehicle, wherein the control unit is configured for adjusting at least one radiant panel present in the interior based on the infrared radiation emitted or reflected by the at least one surface of the interior;

wherein the analysis device is further configured to measure a differential temperature between the interior temperature and an exterior temperature of air present outside the motor vehicle;

wherein the analysis device is configured to convert the infrared radiation emitted into at least one surface temperature of the at least one radiant panel and a surface temperature of the at least one surface of the interior;

wherein the analysis device is further configured to map the at least one surface temperature of the at least one radiant panel and the surface temperature of the at least one surface of the interior after the control unit controls the interior temperature of the air present in the interior of the motor vehicle.

4. The interior as claimed in claim 3, wherein the at least one infrared camera is arranged on at least one element of the interior chosen from among a roof of the interior and a pillar of the interior.

5. The interior as claimed in claim 3, comprising a heating, ventilation and/or air conditioning installation, wherein the control unit of the analysis device is further configured for operating the heating, ventilation and/or air conditioning installation, and wherein the control unit of the analysis device is further configured for controlling the heating, ventilation and/or air conditioning installation configured to deliver an air flow.

\* \* \* \* \*